United States Patent

Aluzzo et al.

[11] 3,982,119
[45] Sept. 21, 1976

[54] COMBINATION DOME AND CARGO LAMP

[75] Inventors: Peter J. Aluzzo, St. Clair Shores; Charles G. Gibson, Warren; Albert T. Olson, West Bloomfield, all of Mich.

[73] Assignee: General Motors Corporation, Detroit, Mich.

[22] Filed: Apr. 21, 1975

[21] Appl. No.: 570,078

[52] U.S. Cl............................ 240/7.25; 240/7.1 R; 240/7.1 A; 240/7.35
[51] Int. Cl.² .......................................... B60Q 1/24
[58] Field of Search............ 240/7.1 R, 7.1 A, 7.25, 240/7.35, 2 R, 2 S

[56] References Cited
UNITED STATES PATENTS

| | | | |
|---|---|---|---|
| 1,599,958 | 9/1926 | Fraser............................ | 240/7.25 X |
| 1,761,345 | 6/1930 | Isackson........................ | 240/2 S X |
| 2,102,967 | 12/1937 | Neel et al....................... | 240/7.1 R |
| 2,129,070 | 9/1938 | Rottinger...................... | 240/7.25 X |
| 2,261,622 | 11/1941 | Hobbs............................ | 240/7.1 R |
| 2,601,142 | 6/1952 | Hubbard....................... | 240/7.1 R X |
| 2,783,365 | 2/1957 | Wilfert.......................... | 240/2 R X |

Primary Examiner—Ulysses Weldon
Attorney, Agent, or Firm—J. C. Evans

[57] ABSTRACT

A vehicle having a cargo area viewed from within the passenger compartment through an interposed window has a combination dome and cargo lamp assembly secured to the overhead of the passenger compartment at a point adjacent the window. A lamp enclosure is movably supported in an overhead dome position for illuminating the passenger compartment and is also adjustably positioned in a cargo illumination position wherein the lamp lens faces the window for directing illumination therethrough into the cargo area. Switch means are responsive to movement of the lamp enclosure from a dome position to a cargo illumination position for automatically energizing lamp means therein whenever the lamp assembly is in its cargo illumination position.

2 Claims, 7 Drawing Figures

COMBINATION DOME AND CARGO LAMP

This invention relates to illuminating means for vehicle passenger compartments and more particularly to a combination assembly for dome light illumination of a passenger compartment and selective illumination of a cargo area in the vehicle.

Various interior lighting systems have been proposed for motor vehicles to provide a selective illumination of different parts of the vehicle from a single lamp housing. For example, in U.S. Pat. No. 2,783,365 a lamp assembly is disclosed that has a pivotal, cylindrical cover 15 adjustable to direct illumination into a greater or lesser portion of a passenger compartment.

In U.S. Pat. No. 2,261,622 a combination lamp assembly is illustrated that includes a lamp therein that serves either as a light for a glove compartment or as a reading lamp when the light is moved from a position within the glove compartment exteriorly thereof by pivotal movement of an outer door on the glove compartment.

While these arrangements are suitable for their intended purpose, they are primarily intended for directing a given amount of light from a fixed source into a passenger compartment area primarily for reducing passenger compartment glare as when a passenger wishes to refer to a map or the like during vehicle operation.

The aforesaid proposals do not totally illuminate the passenger compartment of a vehicle as in the case of a dome light. Furthermore, they do not have the capability of directing illumination from within the passenger compartment to a separate area in the vehicle as, for example, a cargo area that is separated from the passenger compartment by an interposed viewing window.

Accordingly, an object of the present invention is to provide an improved combination dome and cargo lamp assembly for a vehicle of the type having a passenger compartment and a cargo area with a viewing window therebetween wherein the lamp assembly includes a fixed plate portion and a movable plate portion having a lamp housing secured thereon and wherein the plates are removably secured together to locate the lamp housing in a dome position for directing light through a lens thereof to illuminate the passenger compartment and wherein the lamp housing is adjustably positioned with respect to the fixed plate in a location where the lens faces a window between the passenger compartment and a cargo area for directing light from the lamp housing directly through the window to selectively illuminate the cargo area.

Yet another object of the present invention is to provide a multipurpose lamp assembly adjustably positioned within the passenger compartment of a vehicle to produce a dome light function when in a first position and movably positioned from the first position into a second position wherein light is directed from the lamp assembly outwardly of the passenger compartment for illuminating a cargo area located separate from the passenger compartment.

Still another object of the present invention is to provide a compact, easily assembled combination dome and cargo lamp having a fixed plate adapted to be secured to the overhead of a passenger compartment and a second plate pivotally secured to the fixed plate having a lamp housing secured thereto with a lens portion thereon; with coacting means on the fixed and movable plate securing the lamp housing in a first position to locate the lens in a dome position for illuminating the passenger compartment; the coacting means being releasable to permit separation of the plates into an opened relationship therebetween wherein the lamp housing is positioned to face the lens in a direction outwardly of the passenger compartment for selectively illuminating a cargo area of the vehicle separate from the passenger compartment.

Yet another object of the present invention is to provide a combination lamp assembly as set forth in the aforesaid object wherein circuit means are provided on the plates including switch means responsive to movement of the plates into their opened relationship to automatically complete an energization circuit for a lamp within the housing for illumination of the cargo area whenever the lamp housing is shifted into its cargo area illumination position.

Further objects and advantages of the present invention will be apparent from the following description, reference being had to the accompanying drawings wherein a preferred embodiment of the present invention is clearly shown.

Figure 1:
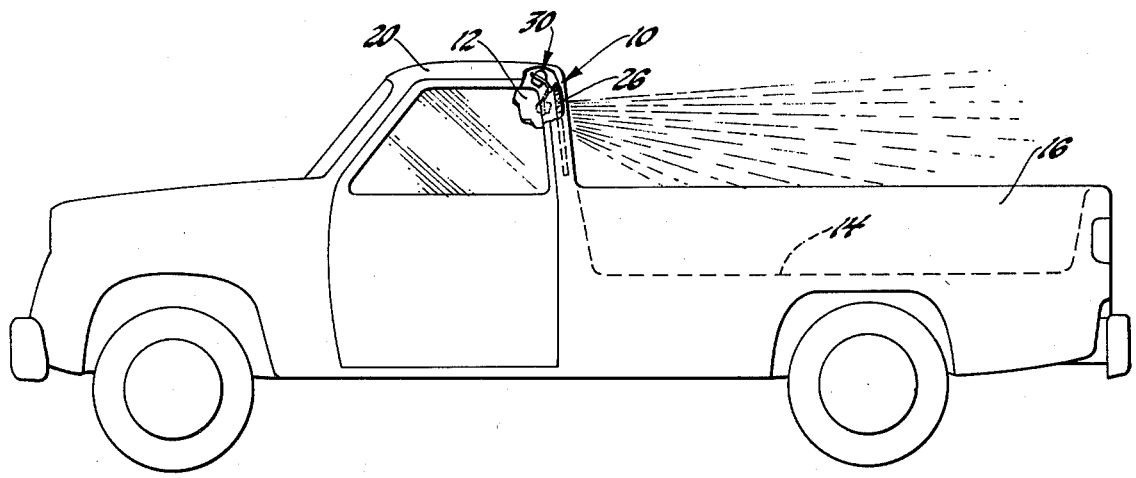
FIG. 1 is a side elevational view, partially broken away, of a pickup including the present invention.

Referring now to FIG. 1, a pickup type vehicle 10 is illustrated including a forward passenger compartment 12 and a rearwardly located cargo area 14 defined by the pickup bed 16.

Figure 2:
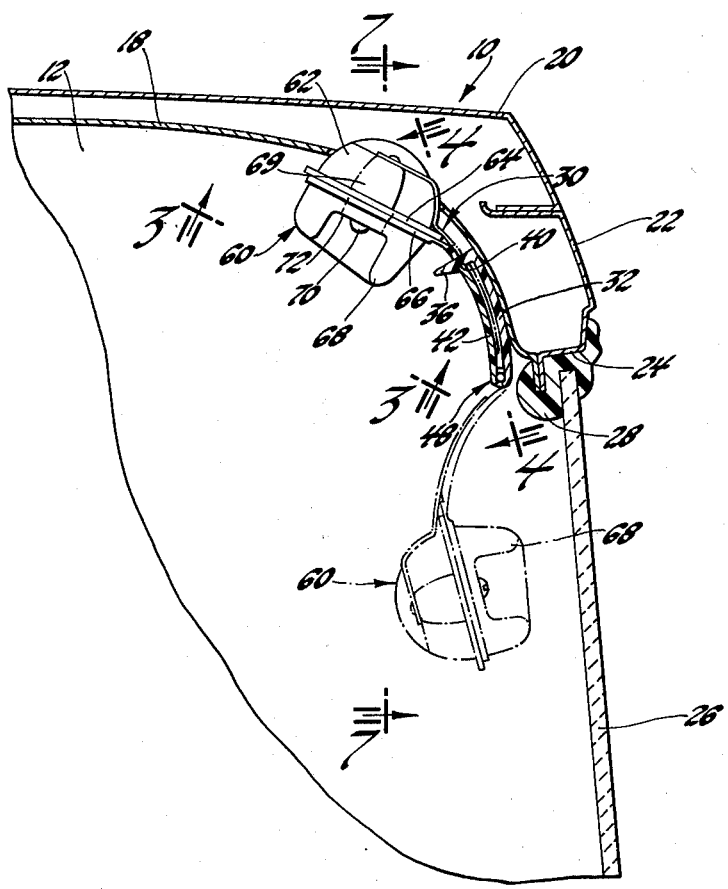
FIG. 2 is an enlarged, fragmentary, sectional view of the present invention showing a lamp housing in a dome and a cargo illumination position.
Figure 3:
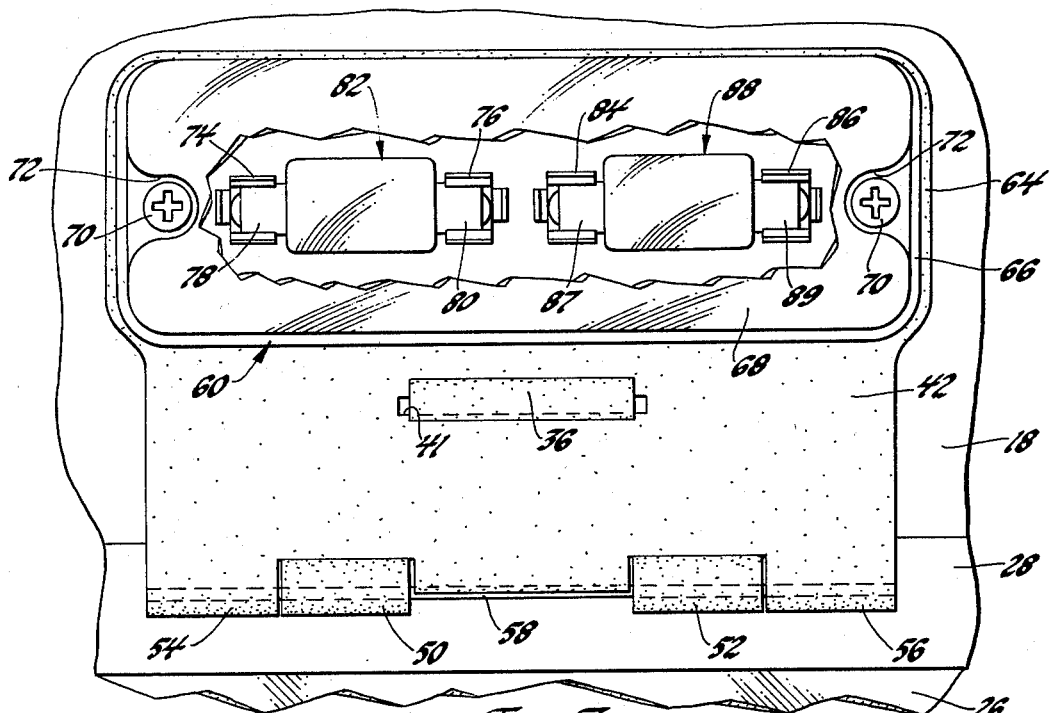
FIG. 3 is an enlarged, fragmentary, sectional view taken along the line 3—3 of FIG. 2 with lens broken away.
Figure 4:
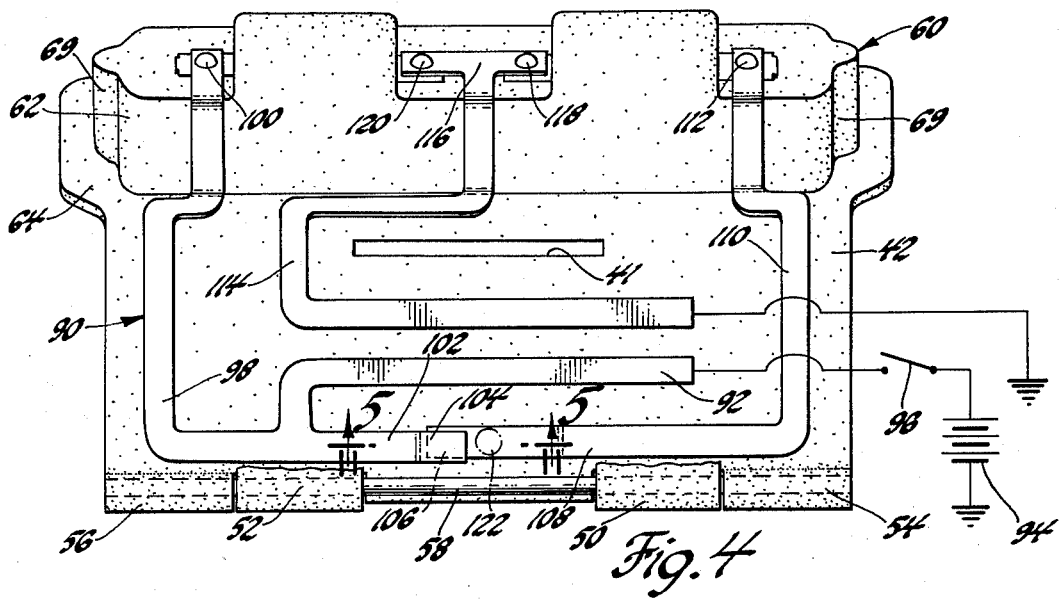
FIG. 4 is an enlarged vertical, sectional view taken along the line 4—4 of FIG. 2.

As best seen in FIG. 2, the passenger compartment 12 includes an overhead liner 18 thereon and a roof 20 that includes a reinforced, rearwardly located, vertical flange 22 that forms an opening 24 having a rear window 26 supported therein. Window 26 is between passenger compartment 12 and cargo area 14 to serve as a rear view as well as to provide observation of the cargo area from the passenger compartment. The rear window 26 is sealed around its perimeter by conventional seal means 28.

Figure 7:
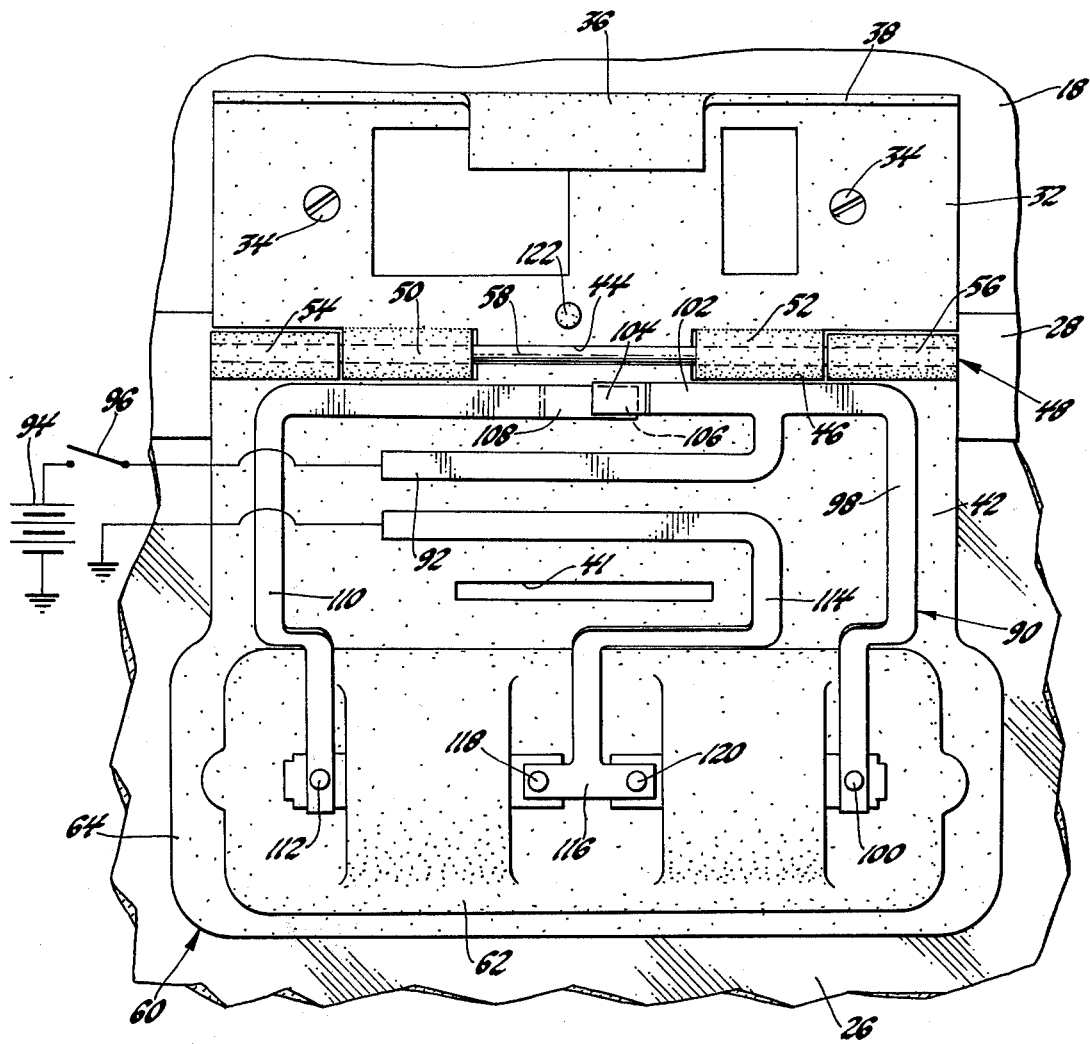
FIG. 7 is an enlarged, fragmentary, sectional view taken along the line 7—7 of FIG. 2 with the lamp housing in a cargo illumination position.

In the illustrated arrangement, the passenger compartment 12 and cargo area 14 are selectively illuminated by means of an improved combination dome and cargo lamp assembly 30. The assembly includes a first connection plate 32 fixedly secured to the overhead liner 18 adjacent the upper edge of the rear window 26. The connection plate 32, as best seen in FIG. 7, is of a generally rectangular configuration and is secured to the liner 18 by means of sheet metal screws 34. It includes a flap-like latch finger or release tab 36 on the upper edge 38 thereof. The tab 36 is directed toward the interior of the compartment 12 as seen in FIG. 2 and includes a retainer notch 40 therein. The flap 36 is insertable within a slot 41 in a second movable plate portion 42 of the assembly 30. The movable plate 42 has a generally rectangular configuration substantially congruous with that of the rectangular configuration of the fixed plate 32. Spaced apart edge portions 44, 46 on each of the plates 32, 42, respectively, are interconnected by hinge 48 including a pair of spaced apart tubular hinge segments 50, 52 on the edge 44 and a separate outer pair of hinge segments 54, 56 on the movable plate 42. A hinge pin 58 is directed through the aligned elements 50 through 56 to define a pivot axis for movement of the movable plate 42 toward and away from the fixed plate 32.

The movable plate 42 has a lamp housing 60 secured thereto including a base portion 62 formed concavely toward the passenger compartment 12 as viewed in the solid line position in FIG. 2. The base portion 62 is preferably integrally formed with the movable plate 42. It includes a peripheral flange 64 formed continuously therearound against which a peripheral flange 66 of an optically clear lens 68 is secured by means of a pair of spaced apart screw elements 70 that are directed through a recessed surface 72 on each end of the lends 68 into threaded engagement with an enlarged segment 69 along the periphery 64 of the base portion 62.

The base 62 has a first pair of wedge configured terminals 74, 76 thereon that receive spaced apart bases 78, 80 of a first electrically energizable lamp 82. A second pair of wedge configured terminals 84, 86 receive opposite bases 87, 89 of a second incandescent lamp 88 located to one side of the lamp 82. The lamps 82, 88 are selectively energized under the control of a circuit 90 that is operative in response to position of the lamp housing 60. The circuit 90 more particularly includes an electrically conductive input strip 92 carried by plate 42. Plate 42 is made of electrical insulating plastic and the strip 92 is connected in series relationship with a power source representatively shown as vehicle battery 94 across a control switch such as the overhead switch or door switch 96. The conductor strip 92 includes a first branch 98 electrically connected to the terminal 86 by means of a rivet 100. It further includes a second branch 102 having an upwardly bent tip 104 that overlies the end 106 of a flexible segment 108 on a conductor strip segment 110 formed in a right angle configuration and having the opposite end connected by means of a rivet 112 to the terminal 74. The tip 104 and segment 108 mate and break to define a position responsive switch as will be discussed.

The circuit further includes a conductor strip 114 having a terminal portion 116 connected by means of rivets 118, 120 to the terminals 76, 84, respectively. The conductor strip 114 is formed around the slot 41 and is adapted to be connected to ground.

Figure 5:
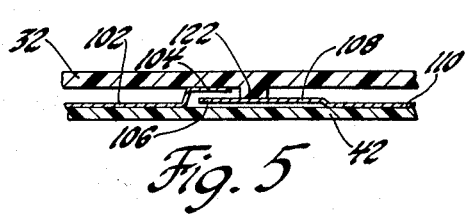
FIG. 5 is a fragmentary, cross-sectional view taken along the line 5—5 of FIG. 4 showing a switch component of the present invention.

By virtue of the above-described circuit and structure, the lamp assembly 30 will have a first operating mode when in a dome position as shown in solid line in FIG. 2. In this position, plates 32, 42 are juxtaposed and held together by tab 36. A tab 122 on the plate 32 will be disposed against the flexible segment 108 as shown in FIG. 5 to space it from the bent end 104 thereby to interrupt an energization circuit for the lamp 82. In the dome position, an energization circuit for lamp 88 is maintained under the control of the switch 96 through conductors 92, 98 and 114 and across the lamp 88. The lamp 88 will thereby serve to direct illumination through the lens 68 when it is in its dome position so as to fully illuminate the passenger compartment 12.

Figure 6:
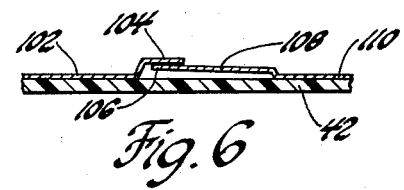
FIG. 6 is a view of the switch illustrated in FIG. 5 in a circuit closed position.

When the lamp assembly 30 is pivoted downwardly about the hinge pin 58 into the dotted line position shown in FIG. 2, the tab 122 will be shifted away from the flexible segment 108 whereby it will move into electrical contact with the bent portion 104 as shown in FIG. 6 so as to complete an energization circuit across both of the lamp assemblies 82, 88.

The energization of the lamp 82 will be under the control and completed upon movement of the lamp housing 60 into the cargo area illumination position shown in dotted line in FIG. 2. In this position, the clear lens 68 is faced in a direction opposite to the position it assumes when in the dome light position. More particularly, it is faced rearwardly to direct illumination through the rear window 26 into the cargo area 14. The lamp 82 will remain energized whenever the tab 40 is positioned to release the lamp assembly 60 into its dependent cargo light position. Also, during this period, the lamp 88 is selectively energized under the control of the switch 96 to produce a high intensity illumination of a cargo area 14.

The dual capability of the assembly 30 is accomplished by means of a single lamp housing that is located and configured more or less like a standard dome light fixture for illuminating the passenger compartment of a vehicle. Nevertheless, it has a dual purpose in that it can be easily positioned in a dependent, rearwardly facing direction so as to illuminate the cargo area of pickup 10. The selective energization of the lamps is obtained by circuit means included totally within the lamp assembly merely requiring the connection of a pair of pigtails to existing circuits of the vehicle to produce dual level intensity illumination of the cargo area when the lamp assembly is pivoted downwardly from its dome light position or single intensity illumination when in the dome light position.

While the embodiments of the present invention, as herein disclosed, constitute a preferred form, it is to be understood that other forms might be adopted.

What is claimed is:

1. A combination dome and cargo lamp assembly for the selective illumination of a passenger compartment and cargo area of a vehicle comprising: a connection plate adapted to be secured to the passenger compartment interior having a latch finger formed on one edge portion thereof, hinge means formed on said connection plate on an edge portion thereof opposite to that of said latch finger, a support plate having one edge connected to said hinge means for pivotal movement of said support plate between dome and cargo illumination positions, coacting means on said latch finger and said support plate for retaining said support plate in juxtaposed position with respect to said connection plate when in its dome illumination position, a lamp enclosure fixedly secured to said support plate and movable therewith for pivotal movement with respect to said connection plate between the dome and cargo illumination position, first and second lamps located within said enclosure, means for energizing said lamps including first switch means operative to maintain one of said lamps permanently deenergized when the lamp plate is in its dome position, said energizing means including second switch means for selectively energizing the other of said lamps when said lamp enclosure is in the dome position, said first switch means being responsive to pivotal movement of said support plate downwardly from said connection plate to complete an energization circuit for said one lamp, said lamp enclosure having a lens thereon faced in one direction when the lamp enclosure is in its dome position, said lamp lens being positioned to face in a direction opposite to said one direction when the lamp enclosure is located in its cargo illumination position.

2. A vehicle lamp assembly comprising: a passenger compartment overhead and roof with a rear view window for observation from the passenger compartment into a cargo area, a connection plate fixedly secured to said passenger compartment overhead at a point above the top of said rear view window, a lamp housing including a support plate extending from one side thereof, means pivotally connecting said support plate to said connection plate for relative separating movement therebetween, coacting means on said connection plate and said support plate for releasably securing said support plate in juxtaposed position with said connection plate, said lamp housing including a lens located in a passenger compartment dome location when the plates are juxtaposed to one another, said lamp housing lens being movable into a cargo illumination position when said support plate and said connection plate are separated, said lamp housing, when positioned in the cargo illumination position, having the lens thereon facing rearwardly towards said rear view window, electrically energizable first and second lamp means within said housing, means including a switch automatically responsive to movement of said lamp housing into the cargo illumination position to maintain at least one of said lamp means energized for illuminating the cargo area when the connection plate and support plates are separated from one another into the cargo illumination position.

* * * * *